(12) United States Patent
Inamdar et al.

(10) Patent No.: US 10,083,131 B2
(45) Date of Patent: Sep. 25, 2018

(54) GENERATING AND/OR EMPLOYING A DESCRIPTOR ASSOCIATED WITH A MEMORY TRANSLATION TABLE

(71) Applicant: Ampere Computing LLC, Santa Clara, CA (US)

(72) Inventors: Tanmay Sunit Inamdar, Sunnyvale, CA (US); Ravi Rajendra Patel, Fremont, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 283 days.

(21) Appl. No.: 14/566,945

(22) Filed: Dec. 11, 2014

(65) Prior Publication Data

US 2016/0170910 A1 Jun. 16, 2016

(51) Int. Cl.
*G06F 12/14* (2006.01)
*G06F 12/1036* (2016.01)
*H04L 12/861* (2013.01)

(52) U.S. Cl.
CPC ...... *G06F 12/1475* (2013.01); *G06F 12/1036* (2013.01); *G06F 12/14* (2013.01); *H04L 49/90* (2013.01); *G06F 2212/1052* (2013.01); *G06F 2212/657* (2013.01)

(58) Field of Classification Search
CPC ............................. G06F 12/1475; G06F 12/14
USPC ......................................................... 711/163
See application file for complete search history.

(56) References Cited

U.S. PATENT DOCUMENTS

| | | | |
|---|---|---|---|
| 6,629,166 B1 | 9/2003 | Grun | |
| 7,509,391 B1 | 3/2009 | Chauvel et al. | |
| 8,284,802 B2 | 10/2012 | Huang et al. | |
| 8,332,531 B2 | 12/2012 | Freimuth et al. | |
| 8,793,467 B2* | 7/2014 | Colgrove | G06F 3/0608 711/206 |
| 2002/0091841 A1* | 7/2002 | Beukema | G06F 12/145 709/229 |
| 2003/0097394 A1 | 5/2003 | Chauvel et al. | |
| 2004/0049600 A1* | 3/2004 | Boyd | G06F 12/145 709/250 |
| 2006/0095690 A1* | 5/2006 | Craddock | G06F 12/1475 711/153 |
| 2006/0274787 A1* | 12/2006 | Pong | G06F 12/0875 370/469 |
| 2009/0070545 A1 | 3/2009 | Stecher | |
| 2009/0254728 A1 | 10/2009 | Kamensky et al. | |

(Continued)

FOREIGN PATENT DOCUMENTS

WO 0192998 12/2001

OTHER PUBLICATIONS

International Search Report & Written Opinion for PCT Application Serial No. PCT/US2015/042600, dated Dec. 29, 2015, 11 pages.

*Primary Examiner* — Gautam Sain

(74) *Attorney, Agent, or Firm* — Alston & Bird LLP

(57) ABSTRACT

Various aspects facilitate implementing a memory translation table associated with key-based indexing. A table component is configured for generating a memory translation table and a key component is configured for allocating a key associated with a memory access based on a virtual address and a set of access permissions. A descriptor component is configured for generating a descriptor associated with the memory translation table that comprises at least the set of access permissions and a portion of the key.

20 Claims, 11 Drawing Sheets

(56) References Cited

U.S. PATENT DOCUMENTS

2013/0042052 A1* 2/2013 Colgrove .............. G06F 3/0608
                                              711/103
2014/0025923 A1* 1/2014 Klein .................... G06F 12/123
                                              711/207

* cited by examiner

US 10,083,131 B2

GENERATING AND/OR EMPLOYING A DESCRIPTOR ASSOCIATED WITH A MEMORY TRANSLATION TABLE

TECHNICAL FIELD

The subject disclosure relates generally to virtual memory, and more particularly to generating and/or employing a descriptor associated with a memory translation table.

BACKGROUND

Virtual memory is a memory management technique that is implemented to reduce data stored in memory (e.g., random-access memory (RAM)). For example, data stored in memory (e.g., RAM) can be temporarily transferred to disk storage (e.g., a page file associated with disk storage). With virtual memory, virtual addresses associated with a page file can be mapped into physical addresses associated with memory (e.g., RAM). However, current virtual memory techniques (e.g., current address translation techniques) are inefficient, inflexible and/or add unwanted latency to computing processes (e.g., reduce processor performance). For example, current virtual memory techniques are inefficient when a remote node is employed to access a virtual memory address of a local node.

The above-described description is merely intended to provide a contextual overview of current virtual memory techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a table component, a key component and a descriptor component. The table component is configured for generating a memory translation table to facilitate communication with at least one communication device. The key component is configured for allocating a key associated with a memory access based on a virtual address and a set of access permissions. The descriptor component is configured for generating a descriptor associated with the memory translation table that comprises at least the set of access permissions and a portion of the key.

In another example embodiment, a method comprises generating a memory translation table to facilitate communication with at least one communication device, allocating a key associated with a memory access based on a virtual address and a set of access permissions, and generating a descriptor for the memory translation table comprising at least the set of access permissions and a portion of the key.

In yet another example embodiment, a system comprises a processor and a remote direct memory access (RDMA) engine. The processor is configured for generating a memory translation table to facilitate communication with at least one communication device, allocating a key associated with a memory access based on a virtual address and a set of access permissions, and generating a descriptor for the memory translation table comprising at least the set of access permissions and a portion of the key. The RDMA engine is configured for employing the memory translation table. In an aspect, the RDMA engine is configured for employing the memory translation table in response to validating the set of access permissions, a length of a memory region associated with the descriptor, and a randomly generated number associated with the key.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
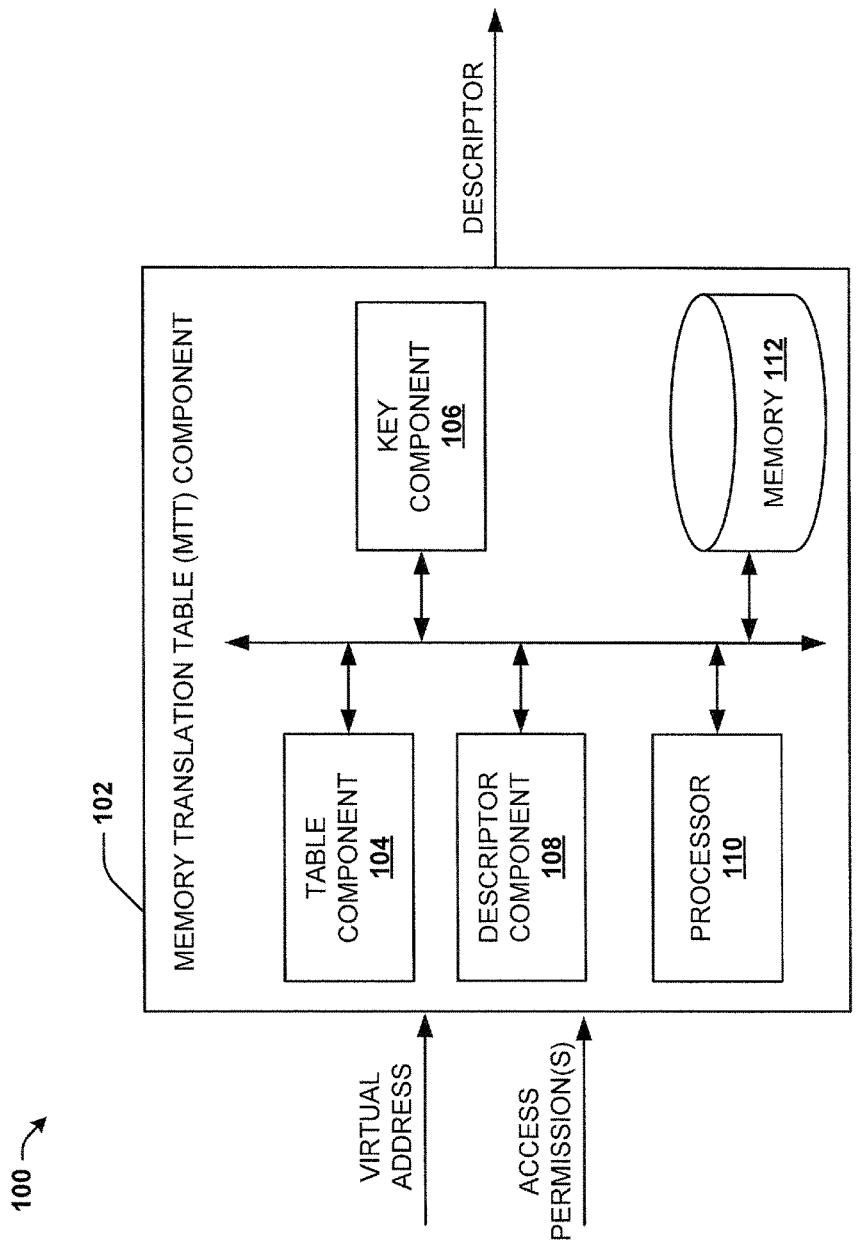
FIG. 1 is a block diagram illustrating an example, non-limiting embodiment of a memory translation table component in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide for generating and/or employing a memory translation table associated with key-based indexing to improve network communications (e.g., switched fabric computer network communications) and/or address translation associated with at least one network device. For example, a memory translation table (MTT) associated with a descriptor format can be generated, formatted and/or maintained. A MTT can be allocated and/or initialized by software (e.g., a device driver of a processor). The software (e.g., the device driver of the processor) can also generate and/or program (e.g., format) a descriptor associated with a MTT for each memory access (e.g., for each memory region associated with an operating system process, etc.). Furthermore, a MTT allocated and/or initialized by the software (e.g., the device driver of the processor) can be employed and/or accessed by hardware (e.g., a remote direct memory access (RDMA) engine). As such, software involvement (e.g., device driver involvement) during a communication operation (e.g., a RDMA operation) associated with a virtual address (VA) to physical address (PA) mapping can be reduced and/or removed. The software (e.g., the device driver of the processor) can transmit a descriptor associated with a MTT to the hardware (e.g., the RDMA engine). A descriptor associated with a MTT can comprise information to allow the hardware (e.g., the RDMA engine) to employ and/or access the MTT (e.g., during runtime). For example, a descriptor associated with a MTT can comprise a portion of a key (e.g., a randomly generated number associated with a key), access permission(s) and/or an index location for the MTT associated with the descriptor.

By generating and/or employing a memory translation table associated with key-based indexing, performance of a processor (e.g., a central processing unit (CPU)) associated with software for facilitating computer network communications and/or address translation can be improved since software is not required to employ VA to PA mappings maintained in software context for each data transaction (e.g., communication operation, RDMA operation, RDMA transactions, etc.) or to program physical addresses for each send command and/or each receive command. A larger mapping of multiple virtually contiguous memory regions can therefore be supported and/or an improved protection mechanism (e.g., for a memory region) can be provided. A memory translation table associated with key-based indexing can also provide greater flexibility by supporting multiple memory regions, shared memory regions, direct memory access regions, fast memory regions, memory regions windows and/or memory regions with increased storage capacity. Moreover, redundancy of accessing and/or programming memory addresses (e.g., physical addresses) for data transactions (e.g., communication operations, RDMA operations, RDMA transactions, etc.) can be prevented by organizing VA to PA mappings via a memory translation table associated with key-based indexing.

Turning now to FIG. 1, a block diagram illustrating an example, non-limiting embodiment of a system 100 in accordance with various aspects described herein is shown. System 100 includes a memory translation table (MTT) component 102. The MTT component 102 can be employed to generate, format and/or maintain one or more memory translation tables (e.g., RDMA memory translation tables) associated with a descriptor format. The MTT component 102 can include a table component 104, a key component 106 and/or a descriptor component 108. In an aspect, the system 100 can be implemented in connection with a memory system (e.g., a virtual memory system). In another aspect, the system 100 can be implemented in connection with a switched fabric topology system. The system 100 can be employed to facilitate network communications and/or address translation (e.g., address translation associated with at least one network device). For example, the system 100 can be employed by various systems, such as, but not limited to server systems (e.g., server class systems), network systems, TCP network systems, internet network systems, data center systems, communication systems, router systems, high availability server systems (e.g., Telecom server systems), Web server systems, file server systems, media server systems, disk array systems, powered insertion board systems, and the like. In one example, the system 100 can be implemented to facilitate improved server and/or inter-server communication.

Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100. In an aspect, the system 100 can be associated with a device driver of a processor. In another aspect, the system 100 can be associated with VA to PA conversion logic.

The MTT component 102 can be configured to facilitate memory registration (e.g., to initialize and/or configure memory) in connection with network device communications and/or address translation (e.g., address translation of local memory and/or remote memory). The MTT component 102 can receive a virtual address (e.g., VIRTUAL ADDRESS shown in FIG. 1) and/or a set of access permissions (e.g., ACCESS PERMISSION(S) shown in FIG. 1). For example the MTT component 102 can receive a message (e.g., a data packet, an instruction, a registration request, a communication request, etc.) associated with a virtual address and/or a set of access permissions. However, it is to be appreciated that a message can be associated with other information (information associated with a queue buffer, information associated with an amount of data to send and/or receive, etc.). The virtual address and/or the set of access permissions can be associated with a memory region (e.g., a local memory region, a remote memory region, etc.). Furthermore, the virtual address and/or the set of access permissions can be received from and/or associated with an application (e.g., a server associated with an upper level communication protocol, storage associated with an upper level communication protocol, a database associated with an upper level communication protocol, etc.). In one example, a message received by the MTT component 102 can be associated with an application that initiates generation of a memory translation table. In another example, a message received by the MTT component 102 can be a work queue element associated with a data queue (e.g., a work queue, a send queue, a receive queue, a completion queue, etc).

The table component 104 can be configured to generate (e.g., initialize and/or allocate) a memory translation table (e.g., at least one memory translation table). A memory translation table can be configured as a virtual address to physical address mapping (e.g., the memory translation table can be employed to map virtual addresses to physical addresses). For example, a memory translation table can comprise one or more entries that map a virtual address to a physical address. In an aspect, a memory translation table can be associated with a protection domain identifier that correlates a message (e.g., a data packet, an instruction, a registration request, a communication operation, etc.) with a memory mapping associated with the virtual address (e.g., to enable and/or control access to a system memory). For example, a memory associated with the memory mapping can be registered with a protection domain associated with the protection domain identifier. Accordingly, a memory translation table can be a unique memory translation table for the protection domain identifier.

A memory translation table generated by the table component 104 can be configured to be accessed by hardware associated with an RDMA engine. In one embodiment, the memory translation table can be stored in a memory (e.g., a double data rate (DDR) memory, a random-access memory (RAM), etc.) associated with a processor (e.g., a CPU). In certain aspects, the table component 104 can allocate and/or initialize a memory translation table in response to one or more predetermined criteria being satisfied. For example, the table component 104 can allocate and/or initialize a memory translation table in response to an external agent (e.g., an application) initiating an action, a particular format of a data packet being received, a particular signal being received, another predetermined criterion being satisfied, etc.

The key component 106 can be configured to generate and/or allocate a key associated with a memory access based on a virtual address and a set of access permissions (e.g., a virtual address and a set of access permissions received by the MTT component 102). A key generated by the key component 106 can be a local key or a remote key. For example, a local key can be a key required for each access to a memory region. A local key can authenticate use of a memory region and/or specify access rights (e.g., access rights for a local node). A remote key can be a key required for RDMA. A remote key can be sent to a remote endnode performing memory access and/or returned to a local endnode by the remote endnode as part of an RDMA request. A memory region can be a registered memory address space (e.g., a registered virtual address space) and/or can provide a mapping required to operate with virtual addresses. Furthermore, a memory region can be associated with a local memory (e.g., a local registered memory) or a remote memory (e.g., a remote registered memory). A key generated by the key component 106 can comprise information, such as but not limited to, a randomly generated number, a set of access permissions for a memory region and/or an index associated with the memory translation table. For example, a lower portion (e.g., lower 8-bits) of a key can represent a random number (e.g., a random 8-bit number), a next portion (e.g., next 8-bits) of the key can represent access permissions, and a higher portion (e.g., upper 16-bits) of the key can represent an index for a memory translation table. In an aspect, the key component 106 can generate a key each time a memory region is registered.

The descriptor component 108 can be configured to generate a descriptor (e.g., DESCRIPTOR shown in FIG. 1) for a memory translation table (e.g., a memory translation table generated by the table component 104). For example, each memory translation table generated by the table component 104 can be associated with a descriptor. Furthermore, the descriptor component 108 can initialize a descriptor for each memory region registered for a protection domain identifier. The descriptor component 108 can store the descriptor at a location in the memory translation table that is specified by the key. For example, the descriptor can be stored at an index location of the memory translation table that is specified by the key. In an aspect, the key component 106 can allocate a key and/or the descriptor component 108 can initialize a descriptor for a memory translation table (e.g., a MTT descriptor) in response to one or more predetermined criteria being satisfied. For example, the key component 106 can allocate a key and/or the descriptor component 108 can initialize a descriptor for a memory translation table (e.g., a MTT descriptor) in response to a memory space (e.g., a register) being configured.

A descriptor associated with a memory translation table (e.g., a descriptor generated by the descriptor component 108) can comprise one or more fields to facilitate key-based indexing. A descriptor associated with a memory translation table can comprise information associated with at least a portion key (e.g., at least a portion of a key generated by the key component 106). For example, information associated with at least a portion key (e.g., at least a portion of a key generated by the key component 106) can include, but is not limited to, a randomly generated number, information associated with the set of access permissions, a defined number, etc. Furthermore, a descriptor associated with a memory translation table can comprise other information. In one example, a descriptor can comprise at least a portion of a key (e.g., a randomly generated number associated with the key generated by the key component 106), a set of access permissions and/or information associated with a memory mapping (e.g., an index location for a memory translation table associated with the descriptor). Additionally, a descriptor can comprise other information, such as but not limited to, virtual address information, memory region length information, page list information, data type information, reserved information and/or other information. In an aspect, a descriptor generated by the descriptor component 108 can be employed by hardware associated with an RDMA engine to facilitate VA to PA conversions for network communications. For example, the MTT component 102 (e.g., the descriptor component 108) can transmit a descriptor to hardware associated with an RDMA engine for each key received and/or employed by the hardware associated with an RDMA engine.

While FIG. 1 depicts separate components in system 100, it is to be appreciated that the components may be implemented in a common component. In one example, the table component 104, the key component 106 and/or the descriptor component 108 can be included in a single component. Further, it can be appreciated that the design of system 100 can include other component selections, component placements, etc., to facilitate generating and/or configuring a memory translation table associated with key-based indexing.

Figure 2:
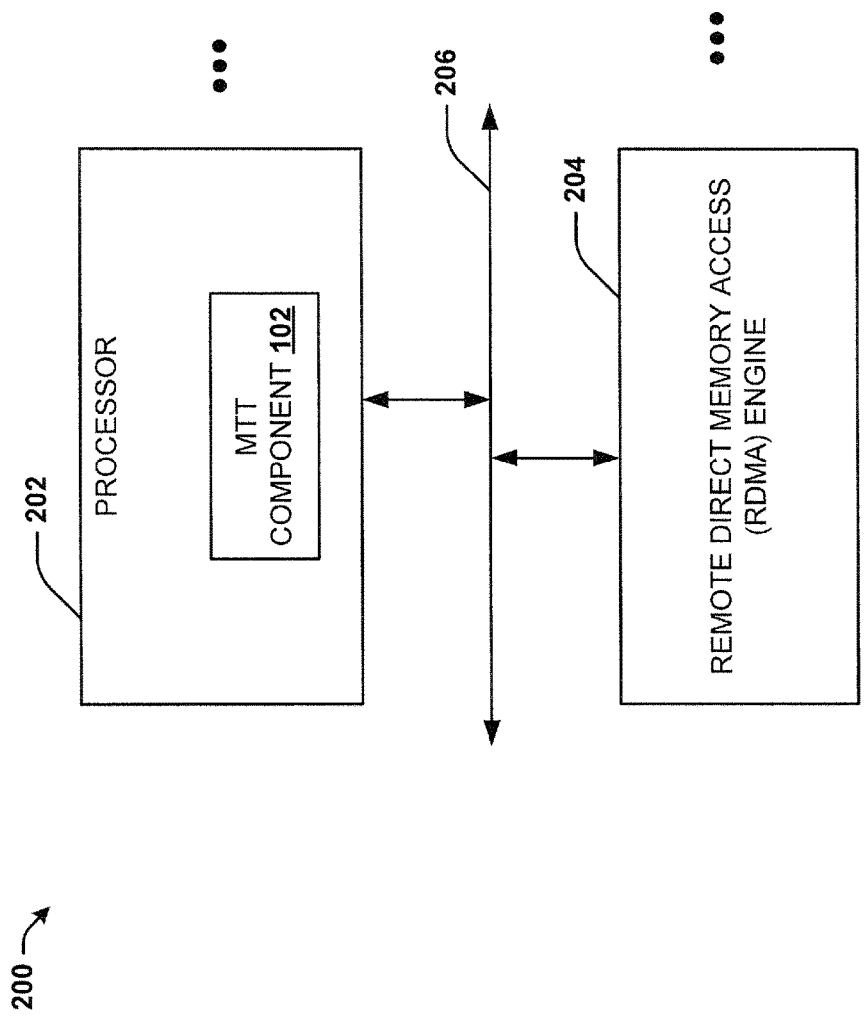
FIG. 2 is a block diagram illustrating an example, non-limiting embodiment of a system in accordance with various aspects described herein.

Referring now to FIG. 2, a block diagram illustrating an example, non-limiting embodiment of a memory system 200 in accordance with various aspects described herein is shown. System 200 includes at least a processor 202 and a remote direct memory access (RDMA) engine 204. In one example, the RDMA engine 204 can be implemented as an RDMA over converged Ethernet (RoCE) engine and/or the RDMA engine 204 can be implemented on an Ethernet component (e.g., a converged Ethernet component). The system 200 can be associated with a system on a chip (SoC).

The processor 202 can include the MTT component 102. In one example, the processor 202 can be a local processor. In another example, the processor 202 can be implemented as at least one CPU. For example, the processor 202 can be a system CPU (e.g., a system-level CPU). The processor 202 can run an operating system (OS) for the system 200. The processor 202 can generate and/or receive a message (e.g., a data packet, an instruction, a registration request, a communication request, etc.) associated with a memory access request.

In an aspect, the processor 202 (e.g., the MTT component 102) can be coupled to the RDMA engine 204 via a system bus 206. It is to be appreciated that the system 200 can include other components coupled to the system bus 206. The MTT component 102 can be associated with and/or included in a memory (e.g., a system memory, a physical memory, etc.). In one example, the MTT component 102 can be associated with and/or included in a double data rate (DDR) system memory. However, it is to be appreciated that the MTT component 102 can be associated with and/or included in a different type of memory.

The processor 202 (e.g., the MTT component 102) can generate and/or initialize a memory translation table (e.g., to facilitate communication with at least one communication device and/or to facilitate address translation). In response to a message (e.g., a message associated with memory access request), the processor 202 (e.g., the MTT component 102, the key component 106, etc.) can generate a key associated with a memory access based on a virtual address and a set of access permissions. A key generated by the processor 202 (e.g., the MTT component 102, the key component 106, etc.) can comprise information, such as but not limited to, a randomly generated number, a set of access permissions and/or an index associated with the memory translation table. A key generated by and/or associated with the processor 202 can also be received and/or employed by the RDMA engine 204 to facilitate network communications between network devices. Furthermore, the processor 202 (e.g., the MTT component 102) can generate a descriptor for the memory translation table. The descriptor can comprise at least the set of access permissions and a portion of the key (e.g., a randomly generated number associated with the key). The processor 202 (e.g., the MTT component 102) can store the descriptor at a location in the memory translation table that is specified by the key (e.g., at an index associated with the memory translation table).

The processor 202 (e.g., the MTT component 102) can transmit a message (e.g., a local message) to the RDMA engine 204. The message transmitted to the RDMA engine 204 can include at least the virtual address and the descriptor generated by the MTT component 102 (e.g., generated by the descriptor component 108). The RDMA engine 204 can be configured to employ the memory translation table based on the message received by the processor 202 (e.g., the MTT component 102). For example, RDMA engine 204 can employ the memory translation table in response to validating information included in the descriptor generated by the MTT component 102 (e.g., validating the set of access permissions, a length of a memory region associated with the descriptor and/or a randomly generated number associated with a key generated by the MTT component 102).

In one embodiment, the processor 202 and the RDMA engine 204 can be associated with hardware and the MTT component 102 can be associated with software (e.g., software employed by the processor 202). As such, software associated with the MTT component 102 can initialize a memory translation table. Moreover, hardware associated with the RDMA engine 204 can employ the memory translation table initialized by the MTT component 102 (e.g., the RDMA engine 204 can employ hardware page table walking of a memory translation table initialized by the MTT component 102). Accordingly, software can initialize a memory translation table while hardware can employ the memory translation table for memory translation (e.g., address translation).

In an aspect, the MTT component 102 can transmit a descriptor comprising a set of access permissions, a portion of a key and/or information associated with a memory mapping (e.g., a descriptor generated by the MTT component 102) to the RDMA engine 204. The RDMA engine 204 can validate information included in the descriptor received from the MTT component 102 before employing a memory translation table associated with the descriptor for memory translation. For example, the RDMA engine 204 can compare a randomly generated number included in the descriptor with a randomly generated number included in a key generated by the key component 106. Additionally or alternatively, the RDMA engine 204 can validate the set of access permissions included in the descriptor. For example, the RDMA engine 204 can compare the set of access permissions included in the descriptor to a command operation code associated with a memory access and/or the processor 202. Additionally or alternatively, the RDMA engine 204 can validate a memory region length included in the descriptor. For example, the RDMA engine 204 can compare a memory region length included in the descriptor to a length associated with a memory request.

The MTT component 102 can allocate and/or initialize a memory translation table in response to one or more predetermined criteria being satisfied. For example, the MTT component 102 can allocate and/or initialize a memory translation table in response to an external agent (e.g., an application) initiating an action, a particular format of a data packet being received, a particular signal being received, another predetermined criterion being satisfied, etc. Additionally, the MTT component 102 can allocate a key and/or initialize a descriptor for a memory translation table (e.g., a MTT descriptor) in response to one or more other predetermined criteria being satisfied. For example, the MTT component 102 can generate (e.g., allocate and/or configure) a key and/or initialize a descriptor for a memory translation table (e.g., a MTT descriptor) in response to a memory space (e.g., a register) being configured. The MTT component 102 can receive a virtual address and a set of access permissions.

Furthermore, the MTT component 102 can generate a physical page list and/or correlate pages of the physical page list to memory. The MTT component 102 can also allocate an array of page addresses and/or maintain a reference in a page list pointer. In an embodiment, the MTT component 102 can configure a key so that the lower 8 bits of the key can comprise a randomly generated number (e.g., a random 8-bit number), the next 8 bits of the key can comprise the set of access permissions, and the higher 16 bits of the key can correspond to an index into a MTT table. The MTT component 102 can also configure a descriptor (e.g., a MTT descriptor) with memory address information (e.g., virtual address information and/or physical address information), a memory region size and/or other information.

In an embodiment, the MTT component 102 (e.g., the table component 104) can allocate a protection domain handle and/or allocate a memory translation table in response to an action initiated by an external agent (e.g., a create protection domain verb initiated by an application). Furthermore, the MTT component 102 (e.g., the table component 104) can receive a virtual address and/or a set of access permissions, generate a physical page list and/or store corresponding pages in memory, allocate an array of page addresses and/or store a reference in a page list pointer, allocate a key and/or can initialize a descriptor in response to another action initiated by an external agent (e.g., a USER_MR verb initiated by an application). The MTT component 102 (e.g., the table component 104) can further receive a protection domain handle for a queue pair, determine a memory translation table base and/or a memory translation table size from protection domain context, and/or configure a memory translation table base and/or a memory translation table size in queue pair context in response to yet another action initiated by an external agent (e.g., a modify queue pair verb associated with a ready to receive state that is initiated by an application). In certain embodiments, the MTT component 102 (e.g., the table component 104) can initialize a virtual address base to a beginning location of a memory (e.g., a DDR memory) and a length (e.g., a length of a memory region) to an end location of the memory (e.g., the DDR memory).

The RDMA engine 204 can receive information regarding a message (e.g., a queue pair number), a key, a virtual address and/or a memory length (e.g., DMA length) via one or more sources and/or one or more messages. For example, the RDMA engine 204 can receive information regarding a message (e.g., a queue pair number), a key, a virtual address and/or a memory length (e.g., DMA length) based on a type of device associated with the RDMA engine 204 (e.g., whether the RDMA engine is associated with a responder device or a requester device, etc.) and/or a type of command (e.g., RDMA READ, RDMA WRITE, RDMA ATOMIC, RDMA SEND, READ RESPONSE, etc.) associated with a received message or a sent message. In certain embodiments, the RDMA engine 204 can validate access permissions associated with a key against a command operation code associated with the processor 202, determine a memory translation table base from queue pair context, calculate a memory region index from a key via a bit shifting operation, validate a key against a memory translation table size, generate an invalid request acknowledge message in response to a determination that a key index is greater than a memory translation table size, etc.

Additionally, the RDMA engine 204 can fetch a descriptor, determine an address for a descriptor as a function of a memory translation base, an index value and a size of the descriptor, validate a key against a descriptor, validate memory region access permissions against a command operation code associated with the processor 202, validate a virtual address range based on a virtual address base and a memory region size, calculate a page index based on a virtual address base value stored in a header of a message and a virtual address base value associated with a descriptor, calculate an offset value based on a virtual address value and a virtual address base value, calculate a page index based on an offset value and a page size, calculate a page address based on a page list pointer and a page index, calculate a page offset based on a virtual address and a page size, write data to pages until a memory length is reached, read data from pages until a memory length is reached, etc. Accordingly, the MTT component 102 (e.g., the processor 202) can generate and/or configure a memory translation table associated with key-based indexing (e.g., during initialization time) and the RDMA engine can employ a memory translation table generated and/or configured by the MTT component 102 (e.g., during run time).

Figure 3:
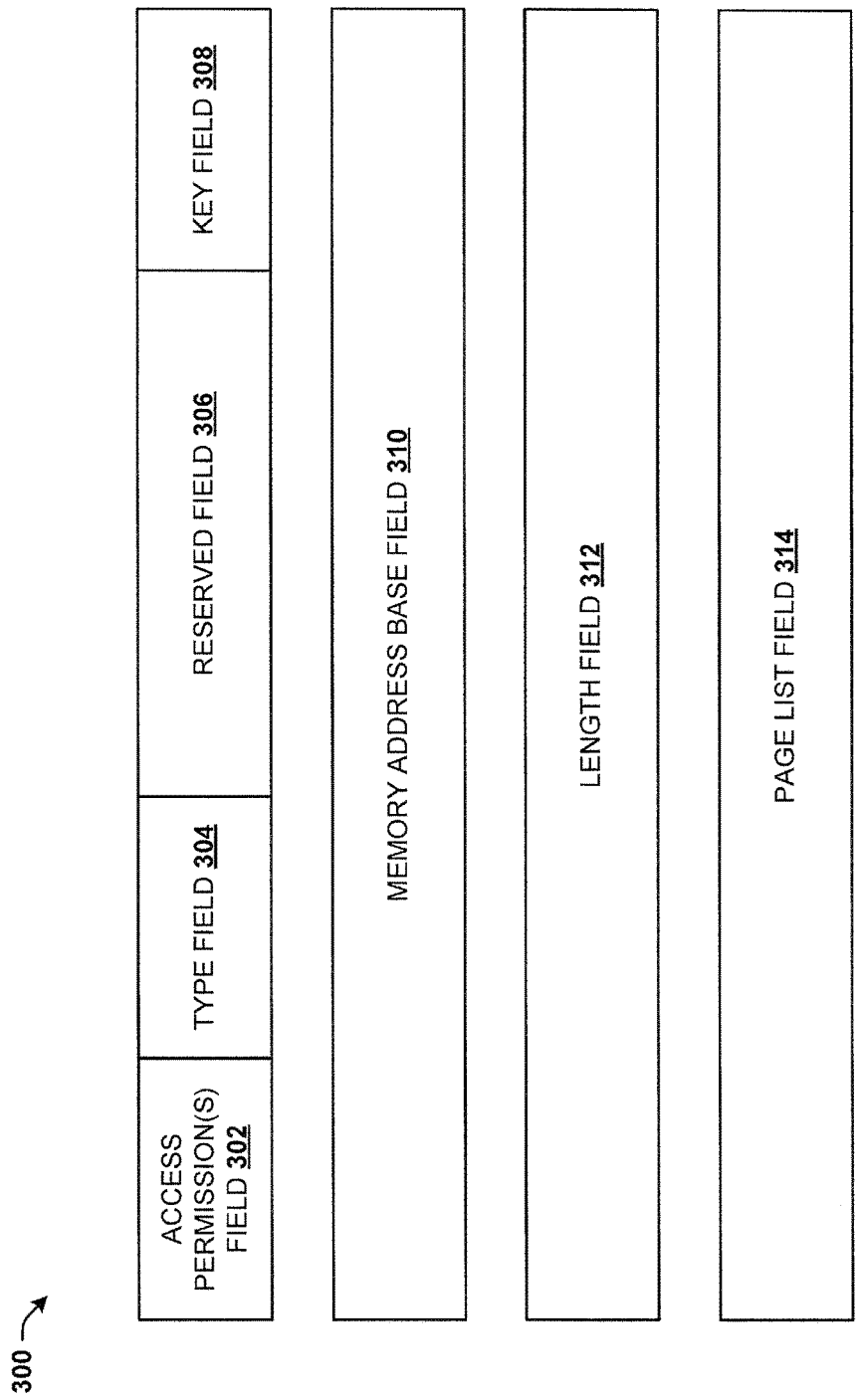
FIG. 3 illustrates a non-limiting example of a descriptor in accordance with various aspects described herein.

Turning to FIG. 3, illustrated is an example, non-limiting embodiment of a descriptor 300 in accordance with various aspects described herein. Descriptor 300 includes an access permission(s) field 302, a type field 304, a reserved field 306, a key field 308, a memory address base field 310, a length field 312 and/or a page list field 314. However, it is to be appreciated that the descriptor 300 can include one or more other fields. The descriptor 300 can be a memory translation table (MTT) descriptor. For example, the descriptor 300 can be associated with a single memory translation table. In a non-limiting example, the descriptor 300 can be a 32 byte descriptor. For example, the access permission(s) field 302 can be 8 bits, the type field 304 can be 8 bits, the reserved field 306 can be 40 bits, the key field 308 can be 8 bits, the memory address base field 310 can be 64 bits, the length field 312 can be 64 bits and the page list field 314 can be 64 bits. It is to be appreciated, however, that the descriptor 300 (e.g., each field included in the descriptor 300) can be configured in a different manner.

The descriptor 300 can be an example descriptor generated by the MTT component 102 and/or received by the RDMA engine 204. The access permission(s) field 302 can include at least a portion of information associated with the set of access permissions received by the MTT component 102. In one example, the access permission(s) field 302 can include an exact mapping of information associated with the set of access permissions received by the MTT component 102. In another example, the access permission(s) field 302 can include a subset of information associated with the set of access permissions received by the MTT component 102. Information included in the access permission(s) field 302 can include, but is not limited to, information associated with access permissions for a memory region, local write access permissions, remote write access permissions, remote read access permissions, remote atomic access permissions and/or other information associated with access permissions. The type field 304 can include an identifier associated with a memory region (e.g., information to identify a type of memory region). The type field 304 can specify whether memory translation is required. For example, a first identifier (e.g., USER_MR) can specify that each address configured in a memory translation is a virtual address (e.g., memory translation is required). A second identifier (e.g., DMA_MR) can specify that each address supplied to a RDMA engine 204 is a physical address (e.g., memory translation is not required). The reserved field 306 can be an empty data field (e.g., the reserved field 306 can be employed as a placeholder field). However, it is to be appreciated that the reserved field 306 can include different information.

The key field 308 can include at least a portion of information associated with a key generated by the key component 106. In an aspect, the key field 308 can include a randomly generated number (e.g., a randomly generated number associated with a key generated by the key component 106). In one example, the randomly generated number can be generated (e.g., by the key component 106) during memory region allocation (e.g., descriptor allocation). It is to be appreciated that the key field 308 can include other information associated with a key generated by the key component 106. The RDMA engine 204 can validate information included in the key field 308 against information included in a key generated by the key component 106 (e.g., a remote key and/or a local key) based on memory region permissions (e.g., access permissions). The memory address base field 310 can include a memory address (e.g., a virtual address, a physical address, etc.) of a memory region. The RDMA engine 204 can employ information included in the memory address base field 310 when determining a page index. The length field 312 can include a total length of a memory region. The RDMA engine 204 can employ information included in the length field 312 to determine whether an incoming memory address and/or length can be stored in a memory region. The page list field 314 can include information associated with a physical address of an array of page addresses. The page addresses can point to pages stored in a physical memory.

Figure 4:
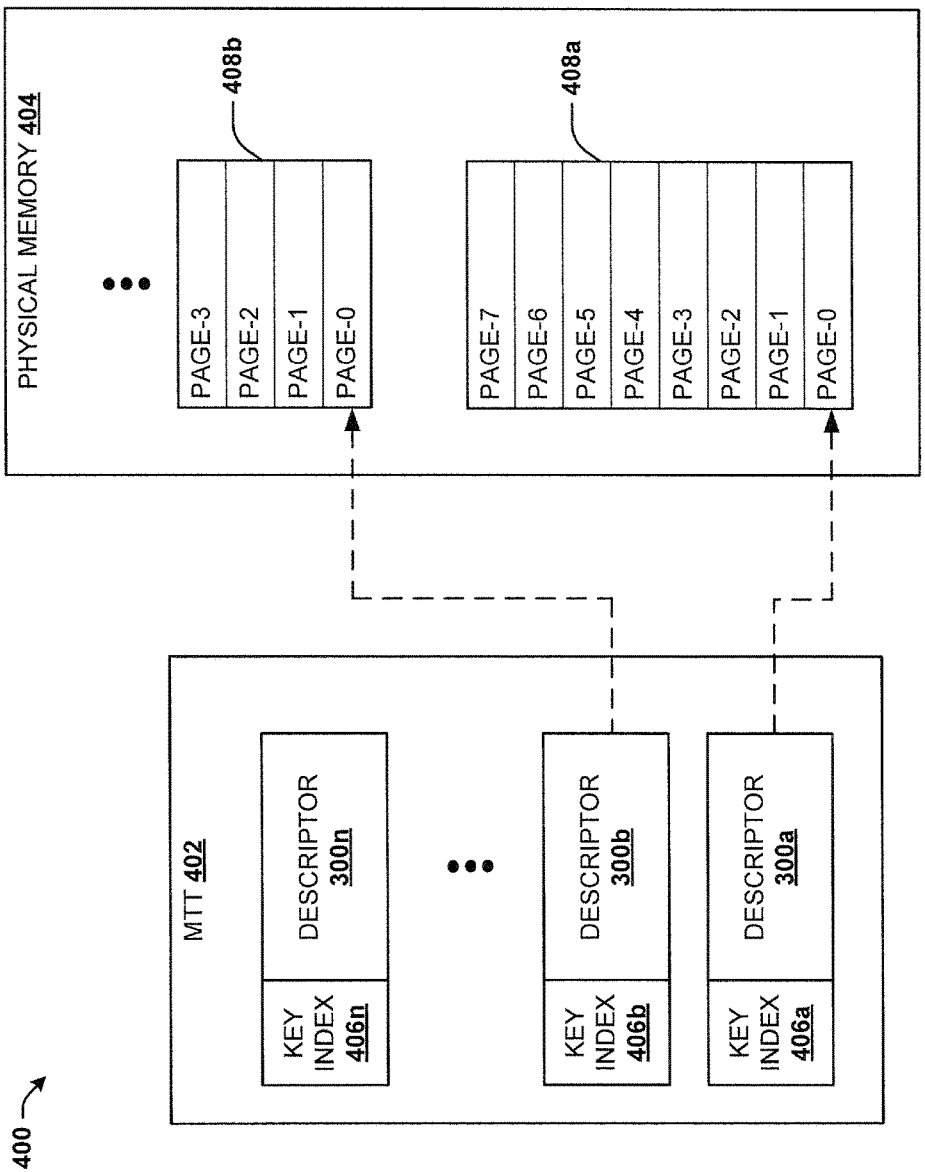
FIG. 4 is a block diagram illustrating an example, non-limiting embodiment of a memory system in accordance with various aspects described herein.

Referring now to FIG. 4, illustrated is a block diagram of an example, non-limiting embodiment of a system 400 in accordance with various aspects described herein. System 400 includes a memory translation table (MTT) 402 and a physical memory 404. In one example, the MTT 402 can be stored separate from the physical memory 404. In another example, the MTT 402 can be stored in the physical memory 404. The MTT 402 can include and/or be associated with one or more descriptors 300a-n associated with key indexes 406a-n. A key index can be an index of a descriptor. For example, a descriptor 300a can be associated with a key index 406a (e.g., a key index value of "0"), a descriptor 300b can be associated with a key index 406b (e.g., a key index value of "1"), a descriptor 300n can be associated with a key index 406n (e.g., a key index value of "n"), etc. Each of the key indexes 406a-n can be associated with a key generated by the key component 106. For example, key index 406a can be associated with a first key generated by the key component 106 (e.g., a value of the key index 406a can be included in a first key generated by the key component 106), key index 406b can be associated with a second key generated by the key component 106 (e.g., a value of the key index 406b can be included in a second key generated by the key component 106), etc. As such, a memory translation table can be configured with key-based indexing.

In an embodiment, each descriptor 300a-n can be configured as descriptor 300 shown in FIG. 3. The physical memory 404 can include a set of page lists. For example, the physical memory 404 can include a page list 408a, a page list 408b, etc. In one example, each page list associated with the physical memory 404 (e.g., page list 408a, page list 408b, etc.) can be a fixed-sized page. The set of page lists associated with the physical memory 404 (e.g., page list 408a, page list 408b, etc.) can be mapped from virtual address space into physical address space via the MTT 402. Information included in a particular descriptor 300a-n (e.g., information included in a page list field of a particular descriptor 300a-n) can be associated with a particular page list stored in the physical memory 404. In an embodiment, the MTT 402 and/or the physical memory 404 can be associated with RAM.

Figure 5:
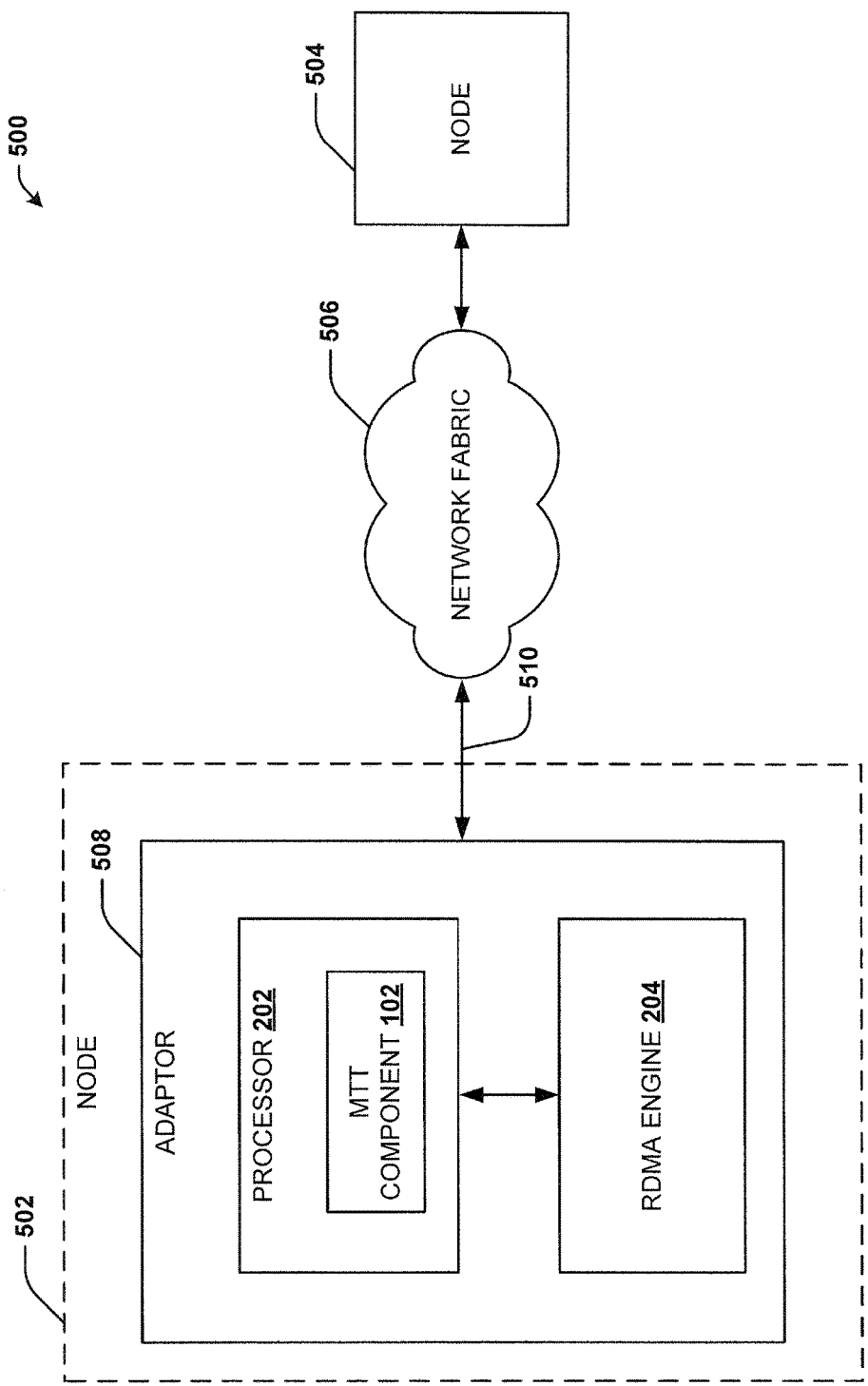
FIG. 5 is a block diagram illustrating an example, non-limiting embodiment of a network system in accordance with various aspects described herein.

Turning now to FIG. 5, illustrated is a block diagram of an example, non-limiting embodiment of a system 500 in accordance with various aspects described herein. System 500 includes a node 502 (e.g., an end node 502) and a node 504 (e.g., an end node 504). The node 502 and the node 504 can be coupled via a network fabric 506. The node 502 and the node 504 can be communication devices (e.g., host devices, adaptor devices, network devices, etc.). For example, the node 502 and the node 504 can be a processor node. The network fabric can include one or more switches, one or more links (e.g., one or more communication links) and/or one or more other network devices. In an aspect, the node 502, the node 504 and/or the network fabric 506 (e.g., the system 500) can be associated with a system area network.

The node 502 can include an adaptor 508. The adaptor 508 can be an interface between the node 502 and the node 504 (e.g., the network fabric 506 and/or the node 504). For example, the adaptor 508 can be an interface between the node 502 and a link 510 (e.g., a communication link 510). The link 510 can be a communication channel (e.g., a bidirectional point-to-point communication channel). In one example, the link 510 can comprise copper fiber and/or optical fiber. However, it is to be appreciated that the link 510 can be implemented as a different type of communication channel. The node 502 can send one or more messages over the link 510 to the node 504. Additionally, the node 502 can receive one or more messages over the link 510 from the node 504.

The adaptor 508 can be configured to manage and/or control memory access and/or network communication. In an aspect, the adaptor 508 can be a channel adaptor (e.g., a host channel adaptor, a channel controller, a host controller, etc.). However, it is to be appreciated that the adaptor 508 can be a different type of adaptor. The adaptor 508 can be associated with and/or include the processor 202 and the RDMA engine 204. The processor 202 can include the MTT component 102. Similarly, the node 504 can include an adaptor that includes a processor 202 (e.g., the MTT component 102) and a RDMA engine 204. A MTT component 102 implemented by the node 502 and/or the node 504 can be configured to facilitate network communication over the network fabric 506, as more fully disclosed herein.

Figure 6:
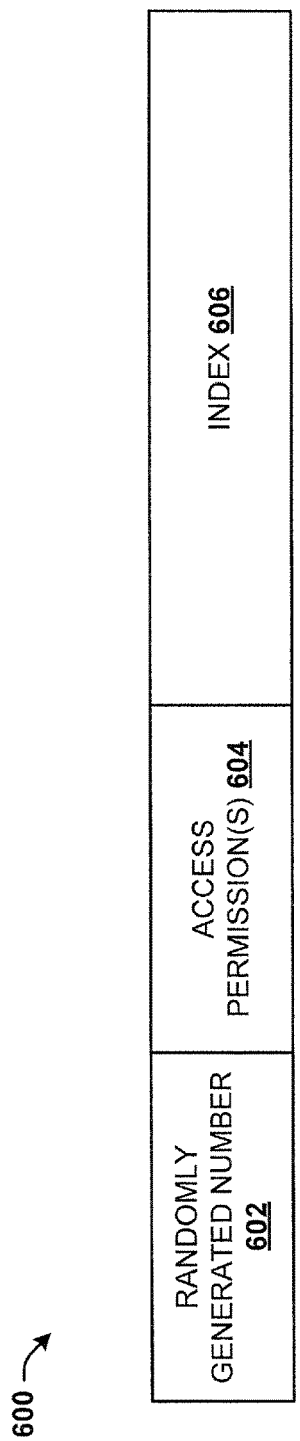
FIG. 6 illustrates a non-limiting example of a key in accordance with various aspects described herein.

Turning to FIG. 6, illustrated is an example, non-limiting embodiment of a key 600 in accordance with various aspects described herein. Key 600 includes a randomly generated number field 602, an access permission(s) field 604 and/or an index field 606. For example, the randomly generated number field 602 can be a lower portion of the key 600, the access permission(s) field 604 can be a next portion of the key 600, and the index field 606 can be a higher portion of the key 600. However, it is to be appreciated that the key 600 can include one or more other fields. In a non-limiting example, the randomly generated number field 602 can be 8-bits in length, the access permission(s) field 604 can be 8-bits in length, and the index field 606 can be 16-bits in length. The key 600 can be generated and/or allocated, for example, by the key component 106.

The key 600 can be associated with a memory access. For example, the key 600 can be a local key or a remote key. In an aspect, the key 600 can be generated in response to a determination (e.g., by the key component 106) that a memory region is registered. The randomly generated number field 602 can include a number value (e.g., a bit value) that is randomly generated (e.g., a randomly generated number, a randomly generated bit value, etc.). The access permission(s) field 604 can include a set of access permissions for a memory region (e.g., a memory region associated with an operating system process, a registered memory address space, a registered virtual address space, etc.). In one example, the set of access permissions included in the access permission(s) field 604 can be received and/or determined by the MTT component 102. The index field 606 can include an index (e.g., an index value) associated with a memory translation table (e.g., a memory translation table generated, initialized and/or allocated by the table component 104).

Figure 7:
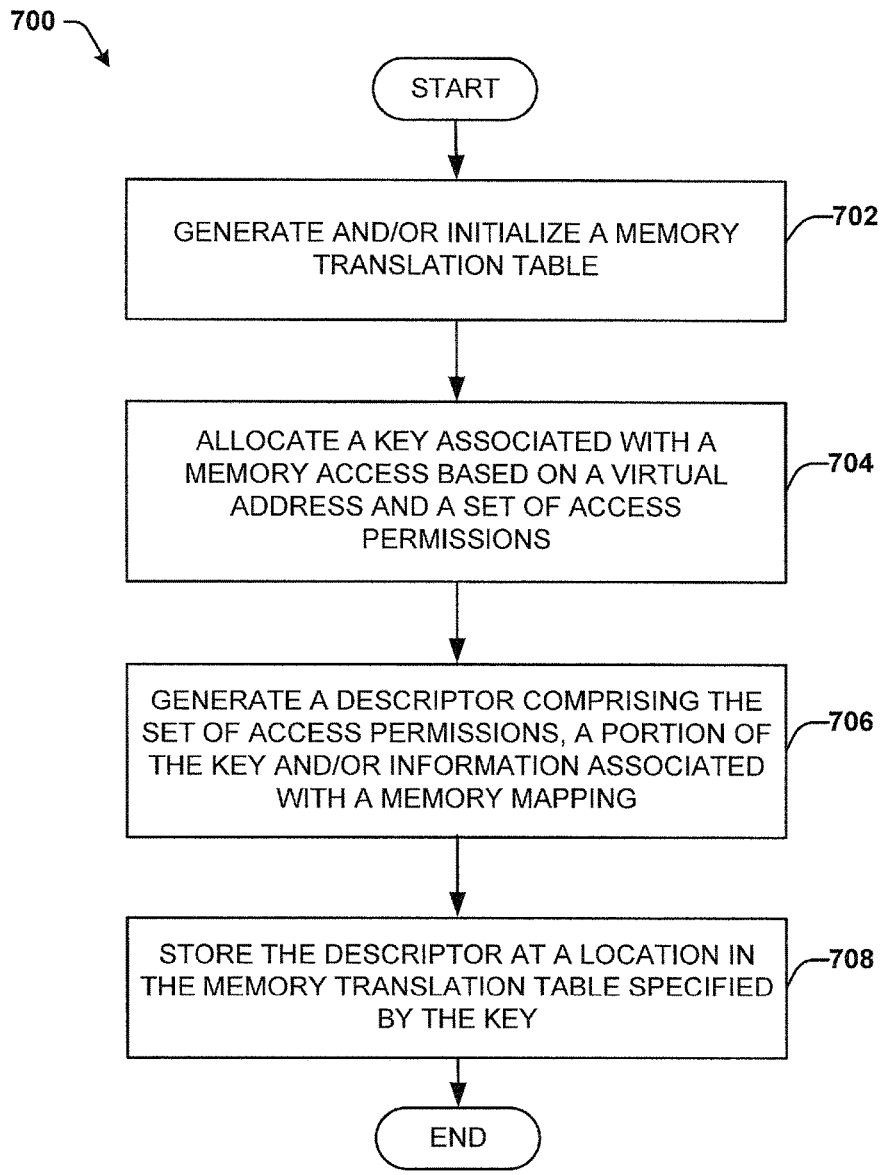
FIG. 7 illustrates a flow diagram of an example, non-limiting embodiment of a method for allocating and/or initializing a memory translation table.
Figure 8:
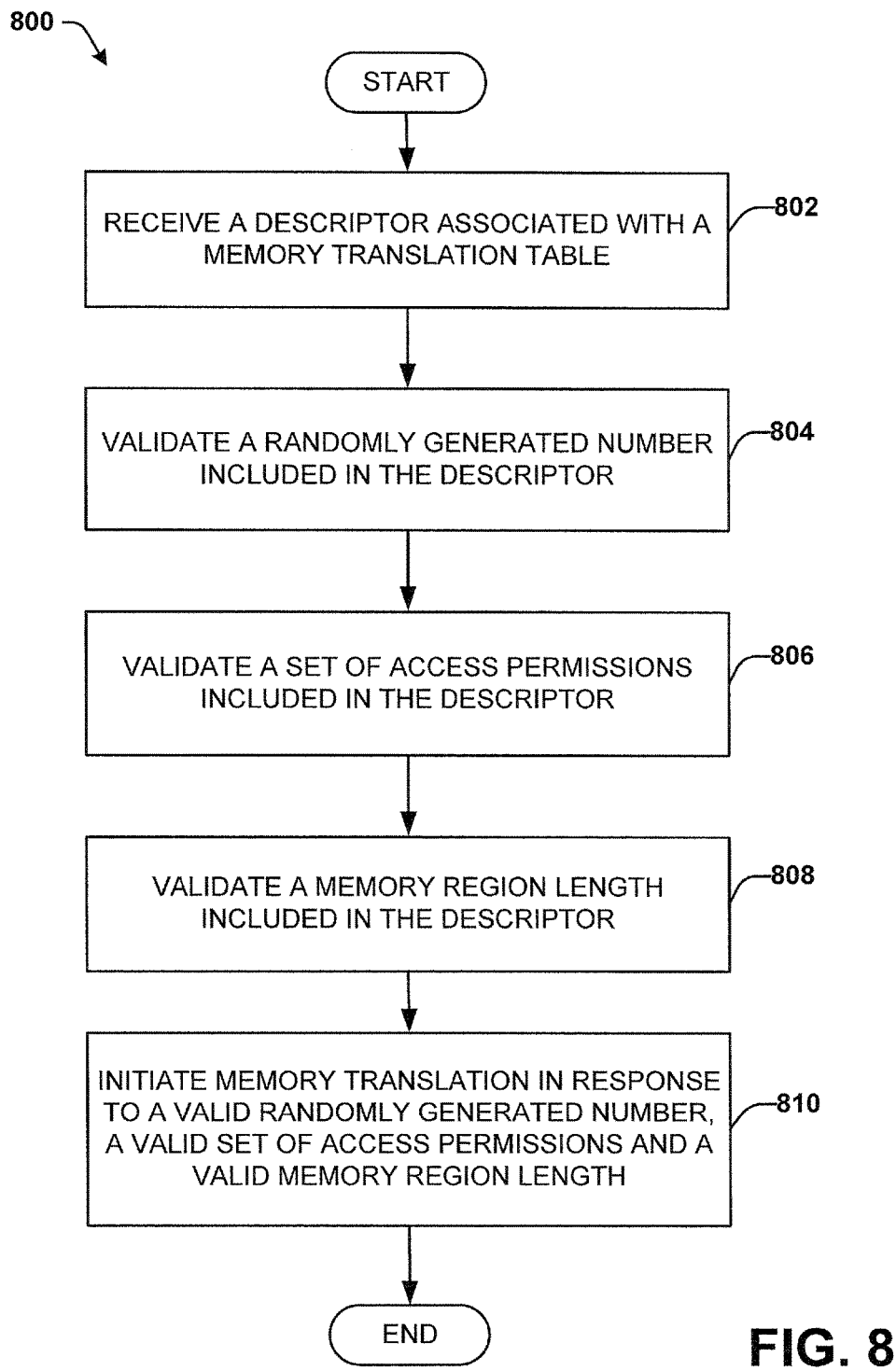
FIG. 8 illustrates a flow diagram of an example, non-limiting embodiment of a method for employing a memory translation table.
Figure 9:
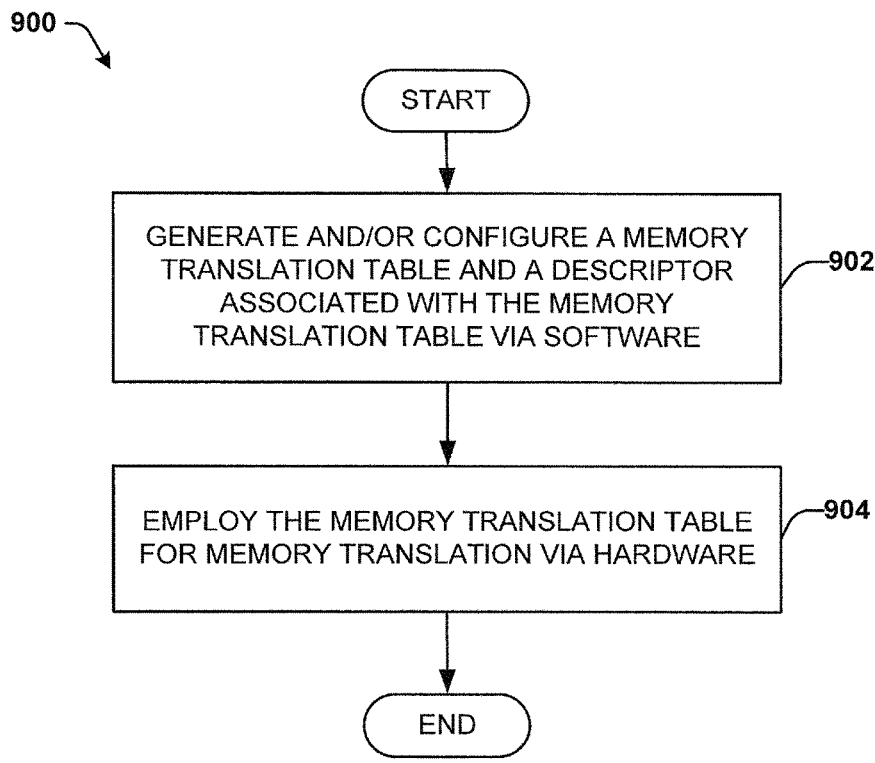
FIG. 9 illustrates a flow diagram of an example, non-limiting embodiment of a method for performing memory translation using key-based indexing.

In view of the example systems described above, methods that may be implemented in accordance with the described subject matter may be better appreciated with reference to the flow charts of FIGS. 7-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a flow diagram of an example, non-limiting embodiment of a method for allocating and/or initializing a memory translation table is shown. Method 700 can begin at block 702, where a memory translation table is generated and/or initialized (e.g., by a table component 104). For example, a memory translation table associated with key-based indexing for remote direct memory access can be generated and/or initialized.

At block 704, a key associated with a memory access is allocated (e.g., by a key component 106) based on a virtual address and a set of access permissions. For example, in response to a memory access request, a key (e.g., a MTT key) can be generated based at least on a virtual address and a set of access permissions associated with the memory access request.

At block 706, a descriptor comprising the set of access permissions, a portion of the key and/or information associated with a memory mapping is generated (e.g., by a descriptor component 108). For example, a descriptor (e.g., a descriptor for the memory translation table) that includes at least a portion of the set of permissions, a randomly generated number associated with the key and/or an index (e.g., a key index) associated with the memory translation table can be generated.

At block 708, the descriptor is stored (e.g., by a descriptor component 108) at a location in the memory translation table specified by the key. For example, the descriptor can be stored at an index (e.g., a key index) of memory translation table specified by a portion of the key included in the descriptor. In an aspect, the descriptor and/or the virtual address can be transmitted to a RDMA engine (e.g., RDMA engine 204).

Referring to FIG. 8, a flow diagram of an example, non-limiting embodiment of a method for employing a memory translation table is shown. In an aspect, method 800 can be implemented in connection with method 700. Method 800 can begin at block 802, where a descriptor associated with a memory translation table is received (e.g., by a RDMA engine 204). For example, a descriptor that includes at least a portion of the set of permissions, a randomly generated number associated with a key and/or an index (e.g., a key index) associated with the memory translation table can be received (e.g., from a MTT component 102).

At block 804, a randomly generated number included in the descriptor is validated (e.g., by a RDMA engine 204). For example, a randomly generated number included in the descriptor can be compared to a randomly generated number associated with a key (e.g., a remote key and/or a local key) required for each access to a memory region.

At block 806, a set of access permissions included in the descriptor is validated (e.g., by a RDMA engine 204). For example, a set of access permissions included in the descriptor can be compared to a command operation code associated with a processor.

At block 808, a memory region length included in the descriptor is validated (e.g., by a RDMA engine 204). For example, a memory region length included in the descriptor can be compared to a length associated with a memory request.

At block 810, memory translation is initiated (e.g., by a RDMA engine 204) in response to a valid randomly generated number, a valid set of access permissions and a valid memory region length. For example, a memory translation table associated with the descriptor can be employed in response to a valid randomly generated number, a valid set of access permissions and/or a valid memory region length.

Referring to FIG. 9, a flow diagram of an example, non-limiting embodiment of a method for performing memory translation using key-based indexing is shown. Method 900 can begin at block 902, where a memory translation table and a descriptor associated with the memory translation table are generated and/or configured by software (e.g., by a MTT component 102). For example, software can allocate and/or initialize a memory translation table. Additionally, software can generate a descriptor for the memory translation table that includes at least a portion of a set of permissions for a memory region, a randomly generated number associated with a key and/or an index (e.g., a key index) associated with the memory translation table.

At block 904, the memory translation table is employed for memory translation by hardware (e.g., by a RDMA engine 204). For example, hardware can access the memory translation table as a function of the descriptor generated by software. In one example, hardware can access the memory translation table in response to validating a randomly generated number associated with the descriptor, a set of access permissions associated with the descriptor and/or a memory region length associated with the descriptor.

Example Computing Environment

Figure 10:
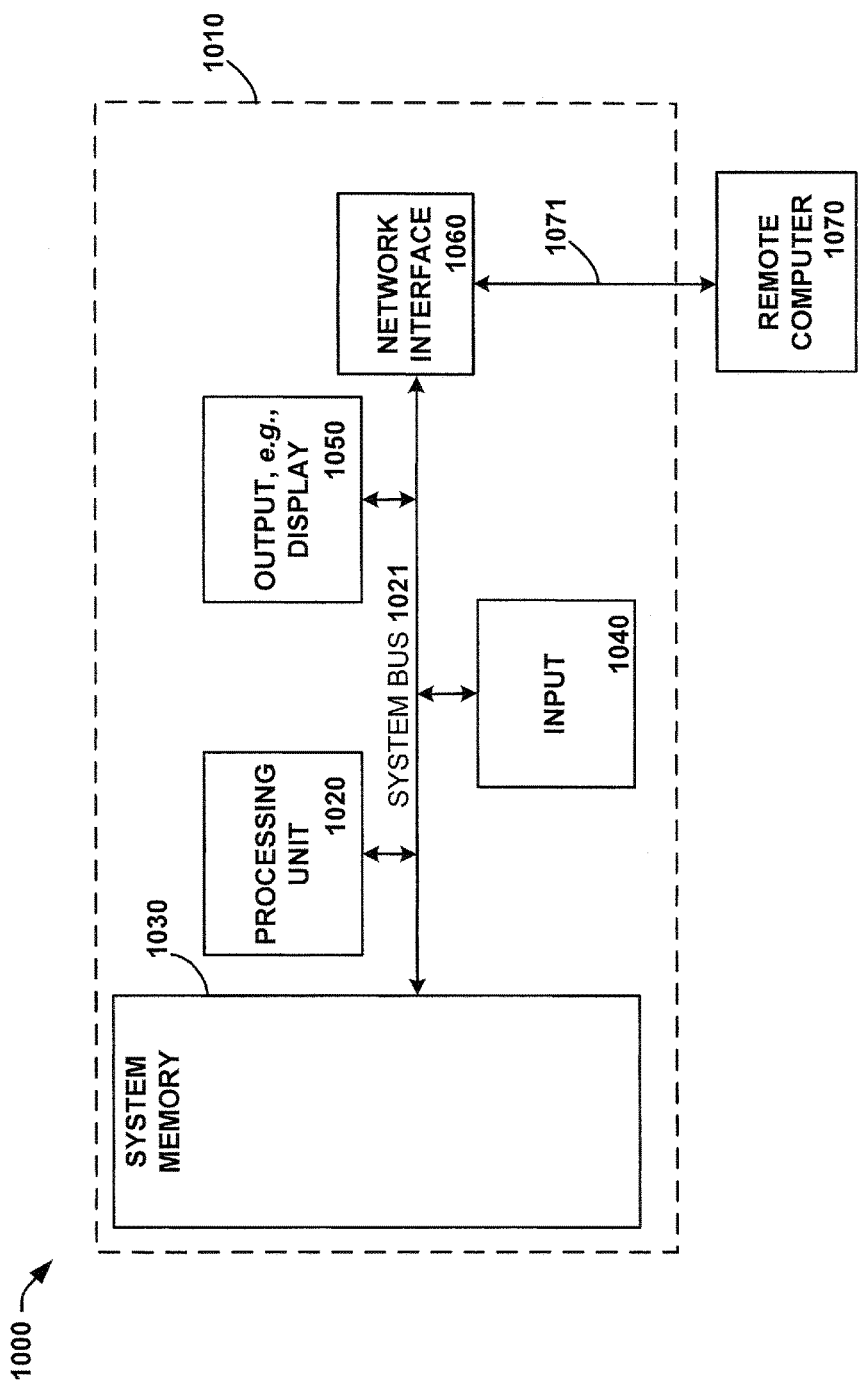
FIG. 10 illustrates a block diagram of an example electronic computing environment that can be implemented in conjunction with one or more aspects described herein.

As mentioned, advantageously, the techniques described herein can be applied to any device where it is desirable to generate and/or employ a memory translation table associated with key-based indexing and/or a descriptor. It is to be understood, therefore, that handheld, portable and other computing devices and computing objects of all kinds are contemplated for use in connection with the various non-limiting embodiments, i.e., anywhere that a device may wish to generate and/or employ a memory translation table associated with key-based indexing and/or a descriptor. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from computer 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

Example Networking Environment

Figure 11:
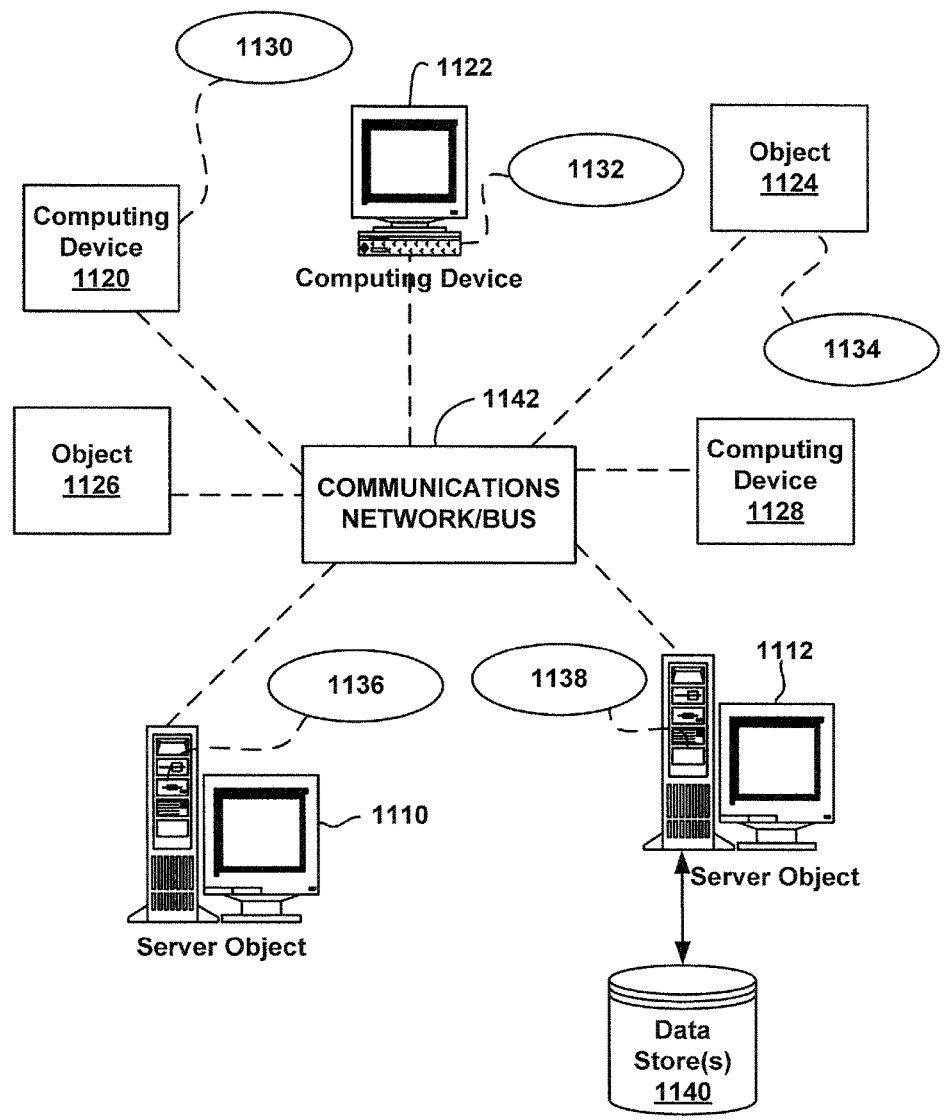
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1140 can include memory or other similar data stores as disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A network communication system, comprising:
a processor configured to execute the following computer executable components:
  a table component configured for generating a memory translation table associated with a hardware processing device to facilitate communication with at least one hardware communication device;
  a key component configured for allocating a key associated with a memory access based on a virtual address, wherein a first portion of the key comprises a set of access permissions, a second portion of the key comprises a first randomly generated number indicative of a bit value that is randomly generated, and third portion of the key comprises an index value associated with an index location for the memory translation table; and
  a descriptor component configured for generating a descriptor and for storing the descriptor at the index location for the memory translation table as specified by the key, wherein the descriptor comprises a portion of the key, and wherein the memory translation table is accessed by a hardware memory engine during the communication with the at least one hardware communication device in response to a first determination that a second randomly generated number included in the descriptor corresponds to the first randomly generated number included in the key, and a second determination that the set of access permissions satisfy a defined criterion.

2. The network communication system of claim 1, wherein the memory translation table is associated with a protection domain identifier that correlates a data packet with a memory mapping associated with the virtual address.

3. The network communication system of claim 2, wherein the memory translation table is a unique memory translation table for the protection domain identifier.

4. The network communication system of claim 2, wherein the descriptor further comprises information associated with the memory mapping.

5. The network communication system of claim 1, wherein the first portion of the key and the second portion of the key comprises a first size and the third portion of the key comprises a second size that is different than the first size.

6. The network communication system of claim 1, wherein the portion of the key and the second portion of the key comprise a corresponding size.

7. The network communication system of claim 1, wherein the first portion of the key and the third portion of the key comprise different bit value sizes.

8. The network communication system of claim 1, wherein the descriptor component is further configured for transmitting the descriptor to the hardware memory engine.

9. The network communication system of claim 1, wherein the key component is configured for determining the virtual address and the set of access permissions based on an application that initiates generation of the memory translation table.

10. The network communication system of claim 1, wherein the key component is configured for transmitting the key to the at least one hardware communication device.

11. The network communication system of claim 1, wherein the descriptor component is configured for storing the descriptor at the index location for the memory translation table in response to a determination that a memory space associated with the memory translation table satisfies a defined criterion.

12. A computer implemented method, comprising:
generating a memory translation table associated with a hardware processing device to facilitate communication with at least one hardware communication device;
allocating a key associated with a memory access based on a virtual address, a first randomly generated number indicative of a number value that is randomly generated, and a set of access permissions;
generating a descriptor for the memory translation table, comprising storing the descriptor at an index location for the memory translation table as specified by the key, the descriptor comprising at least the set of access permissions and a portion of the key; and
providing the memory translation table to a hardware memory engine during the communication with the at least one hardware communication device in response to a first determination that a second randomly generated number included in the descriptor corresponds to the first randomly generated number included in the key, and a second determination that the set of access permissions satisfy a defined criterion.

13. The computer implemented method of claim 12, further comprising storing the descriptor in response to a determination that a memory space associated with the memory translation table satisfies a defined criterion.

14. The computer implemented method of claim 12, further comprising associating the memory translation table with a protection domain identifier that correlates a data packet with a memory mapping associated with the virtual address.

15. The computer implemented method of claim 12, wherein the generating the descriptor comprises storing a memory region length in the descriptor.

16. The computer implemented method of claim 12, wherein the generating the descriptor comprises storing the first randomly generated number associated with the key in the descriptor.

17. The computer implemented method of claim 12, wherein the generating the descriptor comprises storing an index associated with the memory translation table in the descriptor.

18. A computer implemented method, comprising:
receiving, by a hardware memory engine, a descriptor stored at an index location for a memory translation table as specified by a key;
validating, by the hardware memory engine, at least a randomly generated number included in the descriptor by comparing the randomly generated number included in the descriptor with another randomly generated number included in the key that is indicative of a bit value that is randomly generated; and
initiating, by the hardware memory engine, memory translation with respect to data associated with a processor in response to at least a valid randomly generated number and a determination that a set of access permissions included in the descriptor satisfy a defined criterion.

19. The computer implemented method of claim 18, wherein
the validating comprises validating the set of access permission included in the descriptor.

20. The computer implemented method of claim 18, wherein
the validating comprises validating a memory region length included in the descriptor, and
the initiating comprises initiating the memory translation in response to a valid memory region length.

* * * * *